United States Patent [19]
Hattori et al.

[11] 4,063,280
[45] Dec. 13, 1977

[54] CHROMA-SIGNAL PROCESSING SYSTEM

[75] Inventors: Hajime Hattori, Ichinomiya; Tadashi Okada; Eiji Kezuka, both of Yokohama, all of Japan

[73] Assignees: Matsushita Electric Industrial Co., Ltd., Osaka; Chubu-Nippon Broadcasting Co., Ltd., Nagoya, both of Japan

[21] Appl. No.: 726,783

[22] Filed: Sept. 27, 1976

[30] Foreign Application Priority Data

Sept. 30, 1975 Japan .................................. 50-118483

[51] Int. Cl.² ............................................ H04N 9/535
[52] U.S. Cl. .......................................... 358/22; 358/40
[58] Field of Search .................... 358/13, 20, 21, 4, 40

[56] References Cited
U.S. PATENT DOCUMENTS 3,946,432  3/1976  Goldberg et al. ...................... 358/13

Primary Examiner—John C. Martin
Attorney, Agent, or Firm—Stevens, Davis, Miller & Mosher

[57] ABSTRACT

Chroma-signal processing system is disclosed wherein a color television signal is sampled at a frequency equal to a sub-carrier frequency multiplied by an integer, and chroma-components of the sampled signals are sequentially stored in a plurality of storage means for each of the sample points, and the chroma-signals are retrieved from the storage means while omitting portions of the chroma signals whereby accomplishing the chroma-signal processing with a fewer number of storage means. The system can be used to reduce the size of a displayed color image without introducing phase discontinuities into the chrominance subcarrier. The reduced image may then be inset into another color image displayed on a CRT. The system may also be used to reduce the subcarrier frequency of a chrominance signal.

6 Claims, 11 Drawing Figures

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| $y^0_a$ | $y^0_b$ | $y^0_c$ | $y^1_a$ | $y^1_b$ | $y^1_c$ | $y^2_a$ | $y^2_b$ | $y^2_c$ | $y^3_a$ | $y^3_b$ | $y^3_c$ | $y^4_a$ | $y^4_b$ | $y^4_c$ | $y^5_a$ | $y^5_b$ | $y^5_c$ | $y^6_a$ | $y^6_b$ | $y^6_c$ | $y^7_a$ | $y^7_b$ | $y^7_c$ |
| $c^0_a$ | $c^0_b$ | $c^0_c$ | $c^1_a$ | $c^1_b$ | $c^1_c$ | $c^2_a$ | $c^2_b$ | $c^2_c$ | $c^3_a$ | $c^3_b$ | $c^3_c$ | $c^4_a$ | $c^4_b$ | $c^4_c$ | $c^5_a$ | $c^5_b$ | $c^5_c$ | $c^6_a$ | $c^6_b$ | $c^6_c$ | $c^7_a$ | $c^7_b$ | $c^7_c$ |

(b) 3/4 COMPRESSION (IN LENGTH)

| $y^0_a$ | $y^0_b$ | $y^0_c$ | $y^1_b$ | $y^1_c$ | $y^2_a$ | $y^2_b$ | $y^3_a$ | $y^3_b$ | $y^4_a$ | $y^4_b$ | $y^4_c$ | $y^5_a$ | $y^5_b$ | $y^5_c$ | $y^6_a$ | $y^6_b$ | $y^7_a$ | $y^7_b$ | $y^8_a$ | $y^8_b$ | $y^8_c$ | | |
| $c^0_a$ | $c^0_b$ | $c^0_c$ | $c^1_b$ | $c^1_c$ | $c^2_a$ | $c^2_b$ | $c^3_a$ | $c^3_b$ | $c^4_a$ | $c^4_b$ | $c^4_c$ | $c^5_a$ | $c^5_b$ | $c^5_c$ | $c^6_a$ | $c^6_b$ | $c^7_a$ | $c^7_b$ | $c^8_a$ | $c^8_b$ | $c^8_c$ | | |

(c) 1/2 COMPRESSION (IN LENGTH)

| $y^0_a$ | $y^0_c$ | $y^1_b$ | $y^2_a$ | $y^2_c$ | $y^3_b$ | $y^4_a$ | $y^4_c$ | $y^5_b$ | $y^6_a$ | $y^6_c$ | $y^7_b$ | $y^8_a$ | $y^8_c$ | $y^9_b$ | $y^{10}_a$ | $y^{10}_c$ | $y^{11}_b$ | | | | | | |
| $c^0_a$ | $c^0_c$ | $c^1_b$ | $c^2_a$ | $c^2_c$ | $c^3_b$ | $c^4_a$ | $c^4_c$ | $c^5_b$ | $c^6_a$ | $c^6_c$ | $c^7_b$ | $c^8_a$ | $c^8_c$ | $c^9_b$ | $c^{10}_a$ | $c^{10}_c$ | $c^{11}_b$ | | | | | | |

(d) 3/4 COMPRESSION (IN LENGTH)

| $y^0_a$ | $y^0_b$ | $y^0_c$ | $y^1_b$ | $y^1_c$ | $y^2_a$ | $y^2_b$ | $y^2_c$ | $y^3_a$ | $y^3_b$ | $y^4_a$ | $y^4_b$ | $y^4_c$ | $y^5_a$ | $y^5_b$ | $y^5_c$ | $y^6_a$ | $y^6_b$ | $y^7_a$ | $y^7_b$ | $y^8_a$ | $y^8_b$ | $y^8_c$ | |
| $c^0_a$ | $c^0_b$ | $c^0_c$ | $c^1_b$ | $c^1_c$ | $c^2_a$ | $c^2_b$ | $c^2_c$ | $c^3_a$ | $c^3_b$ | $c^4_a$ | $c^4_b$ | $c^4_c$ | $c^5_a$ | $c^5_b$ | $c^5_c$ | $c^6_a$ | $c^6_b$ | $c^7_a$ | $c^7_b$ | $c^8_a$ | $c^8_b$ | $c^8_c$ | |

(e) 1/2 COMPRESSION (IN LENGTH)

| $y^0_a$ | $y^0_c$ | $y^1_b$ | $y^2_a$ | $y^2_c$ | $y^3_b$ | $y^4_a$ | $y^4_c$ | $y^5_b$ | $y^6_a$ | $y^6_c$ | $y^7_b$ | $y^8_a$ | $y^8_c$ | $y^9_b$ | $y^{10}_a$ | $y^{10}_c$ | $y^{11}_b$ | $y^{12}_a$ | $y^{12}_c$ | $y^{13}_b$ | | | |
| $c^0_a$ | $c^0_c$ | $c^1_b$ | $c^2_a$ | $c^2_c$ | $c^3_b$ | $c^4_a$ | $c^4_c$ | $c^5_b$ | $c^6_a$ | $c^6_c$ | $c^7_b$ | $c^8_a$ | $c^8_c$ | $c^9_b$ | $c^{10}_a$ | $c^{10}_c$ | $c^{11}_b$ | $c^{12}_a$ | $c^{12}_c$ | $c^{13}_b$ | | | |

FIG. 8

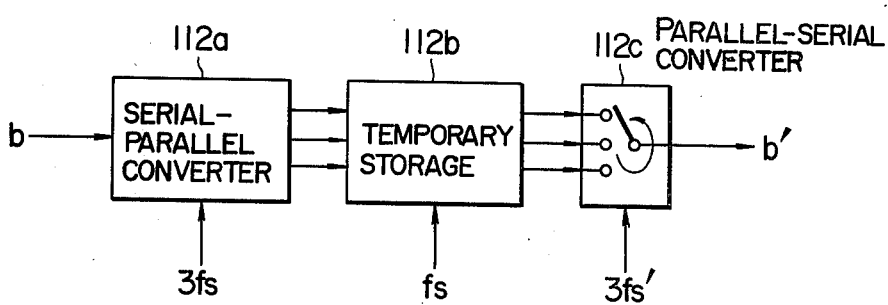

CHROMA-SIGNAL PROCESSING SYSTEM

The present invention relates to a chroma-signal processing system in converting a picture image size of a reproduced picture image of a color television signal comprising a brightness signal and a chroma-signal.

Referring to FIG. 1, as approaches to compress the picture size of the image signal picked up in a standard system as shown in (a), either horizontally as shown in (b) or both horizontally and vertically as shown in (c) and insert the compressed image signal in a portion of another image signal picked up in the standard system as shown in (d), it has been proposed to re-pick up an image, to use a continuous delay line and to sample picture elements using storage devices.

Of those approaches, the picture element sampling method is explained below. In this method, picture elements arranged as shown in FIG. 2(a) are sampled by omitting the hatched picture elements and the sampled picture elements are rearranged in a manner shown in FIG. 2(b) and assigned with new numbers as shown in FIG. 2(c). They are then temporarily stored in a memory in accordance with the numbers shown in FIG. 2(c) and therafter read therefrom. In this manner the image conversion is accomplished. While FIG. 2 illustrates the picture elements along the horizontal scanning line, the principle can be applicable to the picture elements along the vertical line.

When the above method is employed to selectively omit the picture elements at any desired positions of the sampled picture element unit, there occurs a problem in case the picture element signal is a composite signal such as NTSC signal, with regard to a color sub-carrier. It is, therefore, necessary to omit the picture elements for one cycle of the sub-carrier or to color demodulate the signal into simple brightness signal groups, conduct omission process and again modulate to reconstruct a necessary composite signal.

The former method is practically not applicable because of large image distortion in the reproduced image because the picture elements are handled in the unit of one cycle of the sub-carrier. The latter method produces smaller image distortion but possesses another problem of increased number of storge means required to temporarily store the signals because the number of signal groups handled is large.

It is an object of the present invention to provide a chroma-signal processing system for converting the picture image size while maintaining a distortion of a reproduced image to a minimum.

It is other object of the present invention to enable the processing with a fewer number of storage means in a system wherein the omission process is conducted after color demodulation and the signal is again modulated to reconstruct a composite signal.

It is other object of the present invention to facilitate the frequency conversion of sub-carrier of chroma signal.

The above and other objects, features and advantages of the present invention will become more apparent from the following detailed description of the preferred embodiments of the invention when taken in conjunction with the accompanying drawings, in which;

FIG. 7 shows a diagram of signals in the sampling state.

FIG. 8 shows a block diagram of other embodiment.

Figure 3:
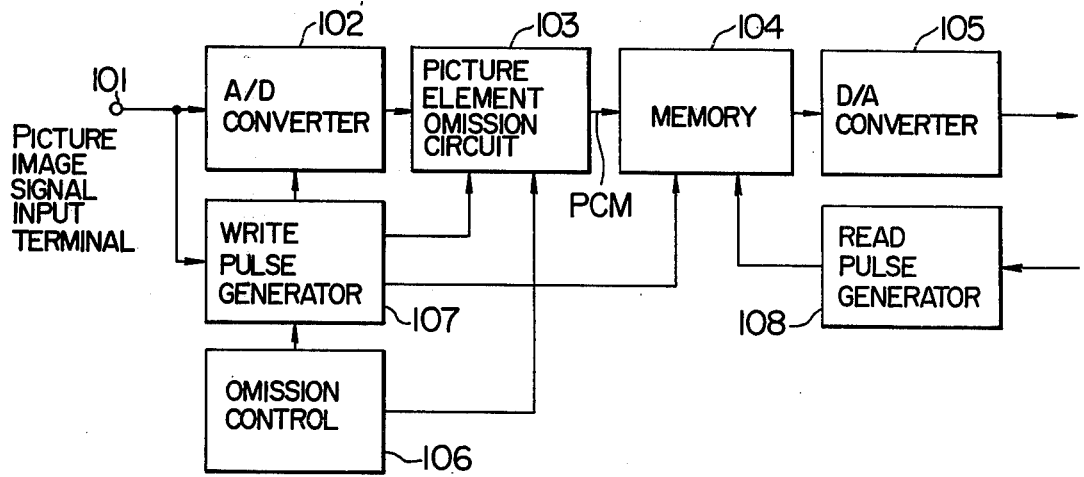
FIG. 3 shows a block diagram of one embodiment which uses a chroma-signal processing system of the present invention.

Referring now to FIG. 3, an embodiment of a processing apparatus employing the chroma-signal processing system of the present invention is shown. The processing apparatus comprises a picture image signal input terminal 101, and A/D converter circuit 102, a picture element omission circuit 103, a memory unit 104, a D/A converter circuit 105, an omission control unit 106 for controlling the picture element omission circuit 103, a write pulse generator 107 and a read pulse generator 108.

A color television signal in NTSC standard system is received at the input terminal 101 and converted to a PCM signal by the A/D converter circuit 102. The PCM signal is then supplied to the picture element omission circuit 103 which, under the control of the omission control unit 106 and the signal from the pulse generator 107, decompose the PCM signal to a brightness component and a chroma component for the picture element omission process. Thereafter the two components are again combined to reconstruct a PCM signal in NTSC standard system. The PCM signal is then written into the memory unit 104 under the control of the output pulse from the pulse generator 107. The written signal is then read out by the pulse from the read pulse generator 108 and converted to an analog signal by the D/A converter circuit 105.

The picture element omission circuit 103 of the above embodiment is now explained below in detail.

Figure 4:
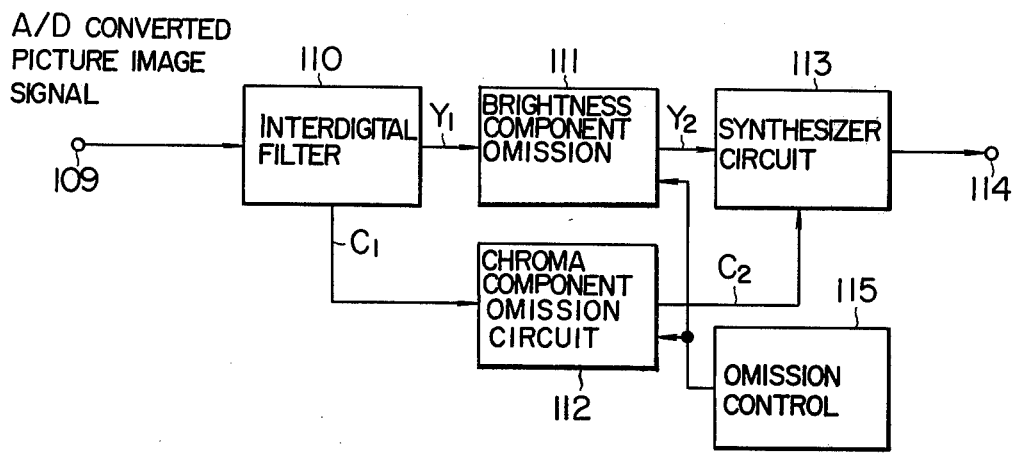
FIG. 4 is a block diagram illustrating further details of major sections of FIG. 3.

FIG. 4 shows a detailed construction of the picture element omission circuit 103 of FIG. 3. It comprises an input terminal 109 to receive the A/D converted picture image signal, an interdigital filter 110 for separating the brightness component and the chroma component from each other, a picture element omission circuit 111 for the brightness component, a picture element omission circuit 112 for the chroma component, a synthesizer circuit 113 for combining the brightness component and the chroma component after the omission process to reconstruct a composite signal, an output terminal 114 thereof, and a control circuit 115 for the omission control, which corresponds to the omission control unit 106 in FIG. 3. The reason for separately processing the brightness component and the chroma component in the picture element omission circuit 103 is that the simultaneous process is impossible by the reason to be described below and that it is intended to advantageously utilize the difference therebetween due to the fact that the change rate of the chroma component in the NTSC signal is smaller than the change rate of the brightness component.

Figure 5:
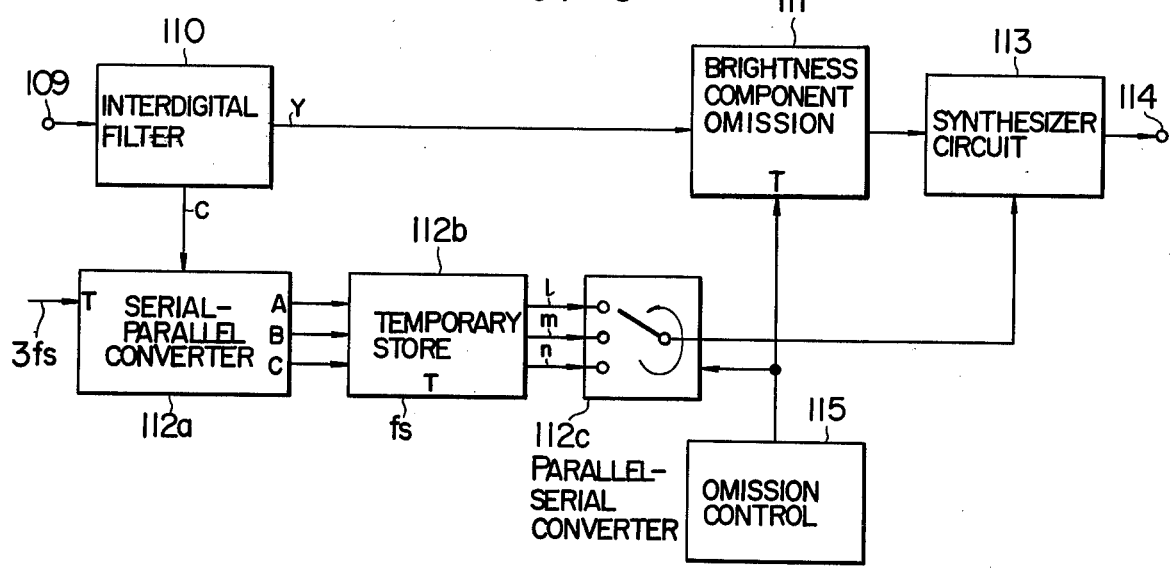
FIG. 5 is a block diagram illustrating further details of major sections of FIG. 4.

FIG. 5 shows further details of the construction of the chroma component processing circuit of FIG. 4. A serial-to-parallel converter circuit 112a converts the separated chroma component to parallel data for the picture elements corresponding to the sample amount of one cycle of the sub-carrier. The sampling frequency is shown to be equal to the triple of the sub-carrier frequency $f_s$. (In the following embodiments, the sampling frequency is assumed to be equal to the triple of the sub-carrier frequency.) The parallel-converted chroma component (parallel data) is stored in a temporary storage 112b which maintains the chroma component for one sub-carrier period. A parallel-to-serial converter circuit 112c switches or scans the temporarily stored chroma component to eliminate the discontinuity of the sub-carrier in the omission process and reconverts the parallel chroma component to serial data. Before the explanation of the operation of the converter circuit 112c, basic properties of the NTSC signal are described.

Figure 6:
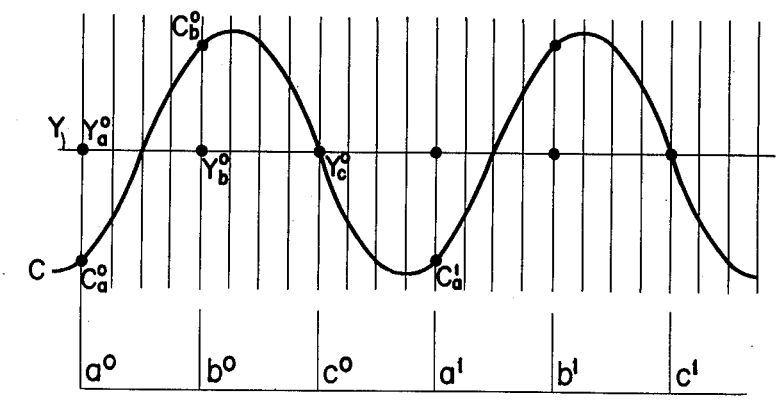
FIG. 6 shows a waveform illustrating a sampling state.

FIG. 6 shows a small portion of a plot on the scan lines for the brightness component and the chroma component of the NTSC signal. The brightness component and the chroma component are shown in superimposed on each other and the phases of the sampling points are shown by dots assuming that there are no changes in the brightness component and the chroma component at corresponding phase points because of the small portion. The sampling frequency is three times as high as the sub-carrier frequency, and the sampling points are represented by $a^0$, $b^0$, $c^0$, $a^1$, $b^1$, $c^1$, — . FIG. 7 shows the results of the omission process shown in FIG. 2 for the brightness signal and the chroma signal, wherein the magnitudes of the sampled brightness signal and the chroma signal are represented by $Ya_0$, $Yb^0$, $Yc^0$, $Ya^1$, $Yb^1$, $Yc^1$, — $Ca^0$, $Cb^0$, $Cc^0$, $Ca^1$, $Cb^1$, $Cc^1$.

Figure 1:
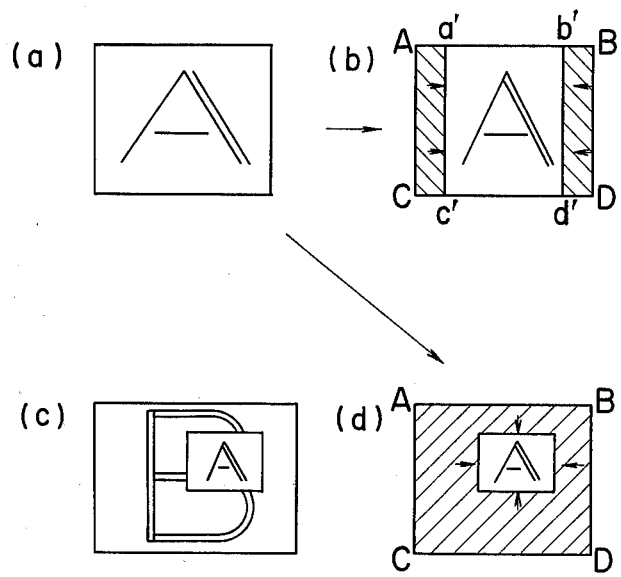
FIG. 1 illustrates the size conversion of a picture image reproduced from a color television signal.
Figure 2:
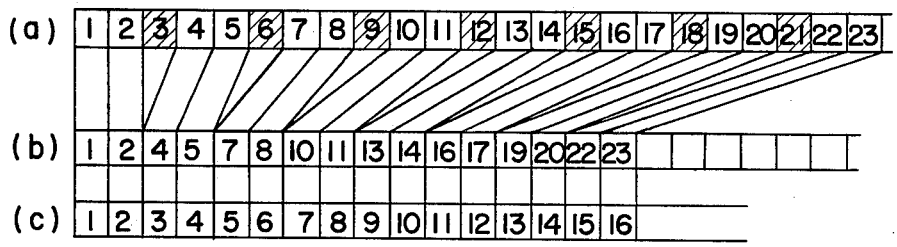
FIG. 2 shows a diagram of signal during a size conversion.

In FIG. 7, (a) shows a group of picture elements before the omission process, and (b) and (c) show the arrangements of the picture elements after the omission process of FIG. 2 has been applied to the brightness component and the chroma component. That is, (b) shows the arrangements of the picture elements after 3/4 compression in length and (c) shows the arrangement after ½ compression.

As seen from FIG. 7, the brightness signal is converted to $Ya^0$, $Yb^0$, $Yc^0$, $Yb^1$, $Yc^1$, $Ya^2$, $Yc^2$, $Ya^3$, $Yb^3$ — for the 3/4 compression and to $Ya^0$, $Yc^0$, $Yb^1$, $Ya^2$, $Yc^2$, $Yb^3$, $Ya^4$, $Yc^4$, $Yb^5$, — for the ½ compression. Thus, the intermediate picture elements are omitted in such a manner as to severely deteriorate the contents of the image. On the other hand, the chroma component is converted to $Ca^0$, $Cb^0$, $Cc^0$, $Cb^1$, $Cc^1$, $Ca^2$, $Cc^2$, $Ca^3$, $Cb^3$, — or to $Ca^0$, $Cc^0$, $Cb^1$, $Ca^2$, $Cc^2$, $Cb^3$, $Ca^4$, $Cc^4$, $Cb^5$, —. Thus, the arrangements are similar to those of the brightness component and the color phase is quite disturbed and the continuity of the sub-carrier is lost. Accordingly the color reproduction is impossible in this system. In the NTSC signal, the frequency band for the brightness signal greatly differs from that for the chroma signal, and the change rate for the brightness component is relatively high while the change rate for the chroma component is relatively low and can be considered constant for several or more cycles of the sub-carrier. Furthermore, the phase of the sub-carrier changes by 180° for each scanning line. Bearing those facts in mind, in the present invention the brightness component is separated from the chroma component and a special process is applied only to the chroma component. The operation of the converter circuit 112c in FIG. 5 is characterized by a switching circuit for effecting the compression process while producing the chroma component in conjunction with the converter circuit 112a and the temporary storage 112b in such a manner to assure the continuity of the sub-carrier. The switch circuit is rotatably operated by the omission pulse from the omission control circuit 115 utilizing the fact that the chroma signal does not change over at least several cycles of the sub-carrier. The signals applied from the control circuit 115 to the circuit 111 and the converter circuit 112c are timing pulses for omitting or sampling the picture elements, by which in the circuit 111, a latch circuit is actuated only when the required picture elements are to be transmitted. These pulses are also applied to the converter circuit 112c to step the switch circuit. That is, the switch circuit is shifted each time a pulse is applied from the control circuit 115 so that it selects the input pulses to the converter circuit 112c in the sequence of $l$, $m$, $n$, $l$, $m$, $n$ — . On the other hand, the chroma signal to the converter circuit 112a is updated or renewed for each sampling pulse of the repetion frequency $3f_s$ and parallel converted for each one cycle of the sub-carrier $f_s$ and stored in the temporary store 112b. Thus, the chroma signal is updated for each one cycle of the sub-carrier $f_s$ and does not change within one cycle of the sub-carrier. As a result, the output from the conversion circuit 112c is $Ca^0$, $Cb^0$, $Cc^0$, $Ca^1$, $Cb^1$, $Cc^2$, $Ca^2$, $Cb^3$, $Cc^3$, — and $Ca^0$, $Cb^0$, $Cc^1$, $Ca^2$, $Cb^2$, $Cc^3$, $Ca^4$, $Cb^4$, $Cc^5$, — as shown in the lower rows of (d) and (e) in FIG. 7. Thus, the continuity of the sub-carrier is maintained in the arrangement and the chroma information has deviated from the corresponding brightness information by up to two sampling points. In the NTSC signal, as stated before, the change rate of the chroma component is relatively low and it can be assumed that the chroma signal remains unchanged for at least one cycle of the sub-carrier. Therefore, the deviation from the brightness signal, that is, two sampling point distance, is considered to include no problem.

In the above embodiment, the chroma signal is processed based on the serial-to-parallel conversion for one period of the sub-carrier. However, the chroma component to be serial-to-parallel converted need not be limited to one period of the sub-carrier. When the chroma signal extends over more than one cycle, a circuit for digitally color-demodulating the signal utilizing the nature of adjacent sampling points and remodulating the signal, or a circuit for averaging the chroma change rate between the sampling points of the same phase may be additionally provided between the temporary storage 112b and the converter circuit 112c in FIG. 5. Furthermore, the number of the sampling points in one cycle of the sub-carrier need not be limited to three but any number of sampling points may be used provided that the serial-to-parallel converter circuit and the parallel-to-serial converter circuit for the chroma component are modified.

Another application of the present invention is a frequency converter of the sub-carrier of the chroma signal. An embodiment thereof is now explained. FIG 8 again shows the parallel-to-serial converter and the switch circuit which perform the chroma signal processing operation described above. The difference of the construction shown in FIG. 8 from that of FIG. 5 resides in that the frequency of the switching signal applied to the converter circuit 112c is n times (three times) as high as the frequency of the sub-carrier and the switching signal is made continuous.

The operation is explained below in detail. It should be noted that the following explanation relates to typical one bit of coded television signal although a plurality of parallel circuits which are equal in number to the number of bits are actually provided. The signal b applied to the converter circuit 112a is sampled at the frequency (3$f_s$) which is n times (three times) as high as the frequency of the sub-carrier frequency of the chroma signal to produce the coded chroma signal of the television signal. This signal is stored in a shift register forming the conversion circuit 112a by the clock pulses at 3$f_s$ and stored in a D-type flip-flop in the temporary storage 112b, after having been serial-to-parallel converted, by the clock pulses at one thirds of 3$f_s$ clock pulses. As a result, the input signal b continuously applied to the converter circuit 112a is stored in the temporary storage 112b for one cycle and all the stored information is substantially updated for each of the cycles.

Figures 9, 10, 11:
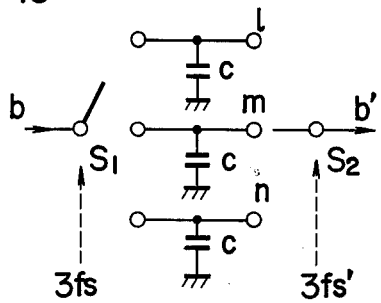
FIG. 9 shows a diagram of the signals thereof.
FIG. 10 shows a wiring diagram of the essential part of further embodiment.
FIG. 11 shows a diagram of signals thereof.

The outputs from the temporary storage 112b are applied to the converter circuit 112c which multiplexes them to produce serial output. The operation described so far is the same as that described before, but since the frequency of the switching input signal applied to the converter circuit 112c is n times (three times) as high as the frequency of the sub-carrier to be converted, the switching operation is not intermittent but continuous. For example, when a PAL signal is to be converted to the NTSC signal, $f_s'$ is 3.58 MHz. FIG. 9 shows the manner of conversion on a time chart of the signal b applied to the conversion circuit 112a to the signal b' at the output thereof. In FIG. 9, (a) shows the manner in which the input signal b changes, and (b) shows three outputs l, m, n, of temporary storage 112b. These outputs are multiplexed by 3$f_s'$ applied to the converter circuit 112c to produce output as shown in (c), in which (i) shows the output b' when $f_s' = \frac{1}{3} f_s$ and they are in phase and (ii) shows the output b' when $f_s' = 2 f_s$ and they are out of phase. Since the change rate of the chroma signal is sufficiently high as compared with the period of the carrier due to an inherent nature of the television signal, it can be considered that $Ca^k = Ca^{K+1} = Ca^{k+2}$, $Cb^k = Cb^{k+1} = Cb^{k+2}$, $Cc^k = Cc^{k+1} = Cc^{k+2}$ (where k is a positive integer). Therefore, the output signal $Ca^0$, $Cb^0$, $Cc^1$, $Ca^1$, $Cb^2$, $Cc^2$, — and the output signal $Ca^0$, $Cb^0$, $Cb^1$, $Cc^1$, $Cc^{2;l}$, $Ca^{2;l}$, $Cb^2$, $Cb^3$, — transmit the substantially same chroma component and hence they may be considered to be a continuous signal. $Cb^0$, $Cb^1$, $Cc^1$, $Cc^2$ show that the output of the temporary storage 112b has changed during or at intermediate of the operation of the switch forming the converter circuit 112c, but this does not substantially affect to the transmitted chroma component by the same reason as described above.

In this manner, the carrier frequency of the chroma signal can be converted. In the circuit of FIG. 8, by replacing the converter circuit 112a with an analog shift register, the temporary storage 112b with an analog memory and the converter circuit 112c with an analog switch, the signals b and b' can be analog signals. FIG. 10 conceptionally shows the circuit of FIG. 8, in which the operation of the converter circuit 112a and the temporary storage 112b, which is considered as a combination of a switch and an analog memory, and the switch operation of the converter circuit 112c are consolidated. The circuit of FIG. 10 basically differs from the circuit of FIG. 8 in that the sampled data are sequentially stored in the analog memories shown by capacitors C and maintained therein for one cycle of the carrier, while in the circuit of FIG. 8 the sampling points are maintained in parallel for one cycle (1/$f_s$) of the carrier by the parallel-to-serial converter. In the present case, the relation between the input signal b and the output signal b' is shown in FIG. 11. The potentials of the outputs l, m, n of the analog memories differ in the manner as shown in (b), but assuming that the relation of $f_s$ and $f_s'$ is same as that in FIG. 9, the output signal b' remains substantially unchanged because of the slow change of the chroma component. Thus, by sequentially storing in n memories the magnitudes of the chroma signals of a first television signal sampled by the clock signal which is synchronized with the color carrier of the first television signal and has a frequency n times as high as the frequency of the color carrier, maintaining the stored data for one cycle of the color carrier, and sequentially switching to read out the respective data at the frequency n times as high as the frequency of a second desired color carrier while eliminating harmonic components, a chroma signal having its color carrier frequency converted can be produced.

This method of converting the sub-carrier frequency makes use of the property of the chroma signal and it is based on a novel idea.

While the processing of the chroma component on the horizontal scanning line has been described, the application of the present invention to the vertical line is now explained. In the NTSC signal, when the sub-carriers on the adjacent scanning lines are compared for each horizontal cycle, they differ in phase by 180°. Accordingly, when the method shown in FIG. 2 (the picture image compression method by the omission of picture elements) is to be applied to the vertical direction (where one picture element is regarded as one scan line), the phase of the sub-carrier on the scan line must be shifted by 180°. Noting a particular scan line, the scan line number originally assigned to that scan line and the scan line number assigned to that scan line after the compression operation has been effected are compared, and only when such scan line number changes from an odd number to an even number or vice versa before and after the compression, the polarity of the sub-carrier on the scan line is changed, where no odd to even change or even to odd change of the original scan line number occurs through the compression operation, the polarity is not changed. In this case, there is imposed a limitation to the phase of the sampling pulse. That is, it is required that the sampling pulses are in phase in two continuous scanning lines.

This can be automatically attained when the sampling frequency is even number times as high as the color sub-carrier, but when it is odd number times as high as the color sub-carrier, the adjustment by a horizontal cycle signal is required.

The change of the polarity of the chroma signal may be effected at any time after the chroma signal has been separated by the interdigital filter of FIG. 5 and before it is combined in the synthesizer circuit 113. In FIG. 5, it may be realized by changing the polarity of the chroma signal (or changing a sign bit) when adding the brightness component and the chroma component together in the synthesizer circuit.

What is claimed is:
1. A chroma-signal processing system comprising the steps of preparing a sampling signal having a sampling frequency which is n times as high as a frequency of a sub-carrier, n being an integer, sampling a color televi- sion signal by said sampling signal, storing chroma components of the sampled color television signals in storage means which are equal in number to the number of sampling points included in one or more cycles of the sub-carrier, reading out the stored chroma components while intermittently omitting portions of the chroma components whereby a continuous color component is reproduced.

2. A chroma-signal processing system according to claim 1 wherein n storage means for maintaining inputs thereto for one cycle of the sub-carrier are provided, and the sampled chroma signals are sequentially stored in said storage means at each sampling point, and the outputs of said n storage means are sequentially selected to derive the chroma signal.

3. A chroma-signal processing system according to claim 1 wherein said sampled chroma components are stored in digital code in said storage means.

4. A chroma-signal processing system according to claim 1 wherein said storage means are capacitors and the sampled chroma signals are sequentially stored in the capacitors.

5. A chroma-signal processing system comprising the steps of sampling a color television signal at a frequency which is n times as high as a frequency of a first sub-carrier, n being a positive integer, storing chroma components of the sampled television signal in n storage means and maintaining them for one cycle of the sub-carrier, reading the stored chroma components by selecting said storage means by clock pulses having a frequency which is n times a high as a frequency of a second sub-carrier different from said frequency of said first sub-carrier, whereby the sub-carrier frequency of the chroma components is converted.

6. A chroma-signal processing system according to claim 5 wherein said sampled chroma signals are stored in digital code in said storage means.

* * * * *